Aug. 16, 1938.　　　　C. W. NESSELL　　　　2,126,914
CONTROL SYSTEM
Filed Dec. 16, 1936　　　2 Sheets-Sheet 2

Fig. 2

Inventor
Clarence W. Nessell
By George H. Fisher
Attorney

Patented Aug. 16, 1938

2,126,914

UNITED STATES PATENT OFFICE 2,126,914

CONTROL SYSTEM

Clarence W. Nessell, Dayton, Ohio, assignor to Minneapolis-Honeywell Regulator Company, Minneapolis, Minn., a corporation of Delaware Application December 16, 1936, Serial No. 116,189

18 Claims. (Cl. 290—30)

This invention relates to load control means for internal combustion engines, and is more particularly concerned with automatically controlled engine driven generating units such for instance as employed for lighting purposes.

In lighting systems such as used for lighting airport beacons, it has been customary to employ two separate engine driven generating units, one of these units being held in reserve in case of failure of the other. Where complete automatic control is desired, timing controllers are employed for starting one of the engines in the evening to cause lighting of the beacons, the controller acting in the morning to stop the engine thus placing the lighting system out of service during the daytime. The controllers are also provided with recycling apparatus for causing starting of the reserve generating unit in the event that the other unit fails to start, or stops running, this recycling apparatus acting to alternately attempt to start each unit until one of the units starts.

Apparatus of this type operates satisfactorily during warm or relatively mild weather. In cold weather, however, difficulties are encountered, in that the automatic control mechanism, while causing starting of one unit permits the lighting load to be thrown upon that unit before its engine has become sufficiently warm to carry the load. This results in stalling of the unit. The automatic controller then recycles and attempts to start the reserve unit. When that unit starts, the lighting load thrown upon it acts to stall it in the same manner as the first unit stalled. After stalling of the second unit, the controller recycles, causing starting of the first unit, and when that unit starts, it again stalls. This recycling process is then continuously repeated, the engines alternately starting and stalling until the starting batteries are discharged.

It is therefore a primary object of my invention to provide an arrangement for overcoming the difficulty aforementioned. More particularly, it is an object of my invention to provide in a system of the type mentioned a means for preventing the load from being thrown on a generating unit until the operation of its engine is sufficiently satisfactory as to enable it to carry the load.

A further object is to provide a novel control arrangement for automatically starting an internal combustion engine and for placing the load upon said engine only when its temperature becomes sufficiently high to ensure its carrying the load without stalling.

Other objects will appear as this description proceeds.

For a detailed description of my invention, reference is made to the accompanying drawings, in which.

Figure 1:
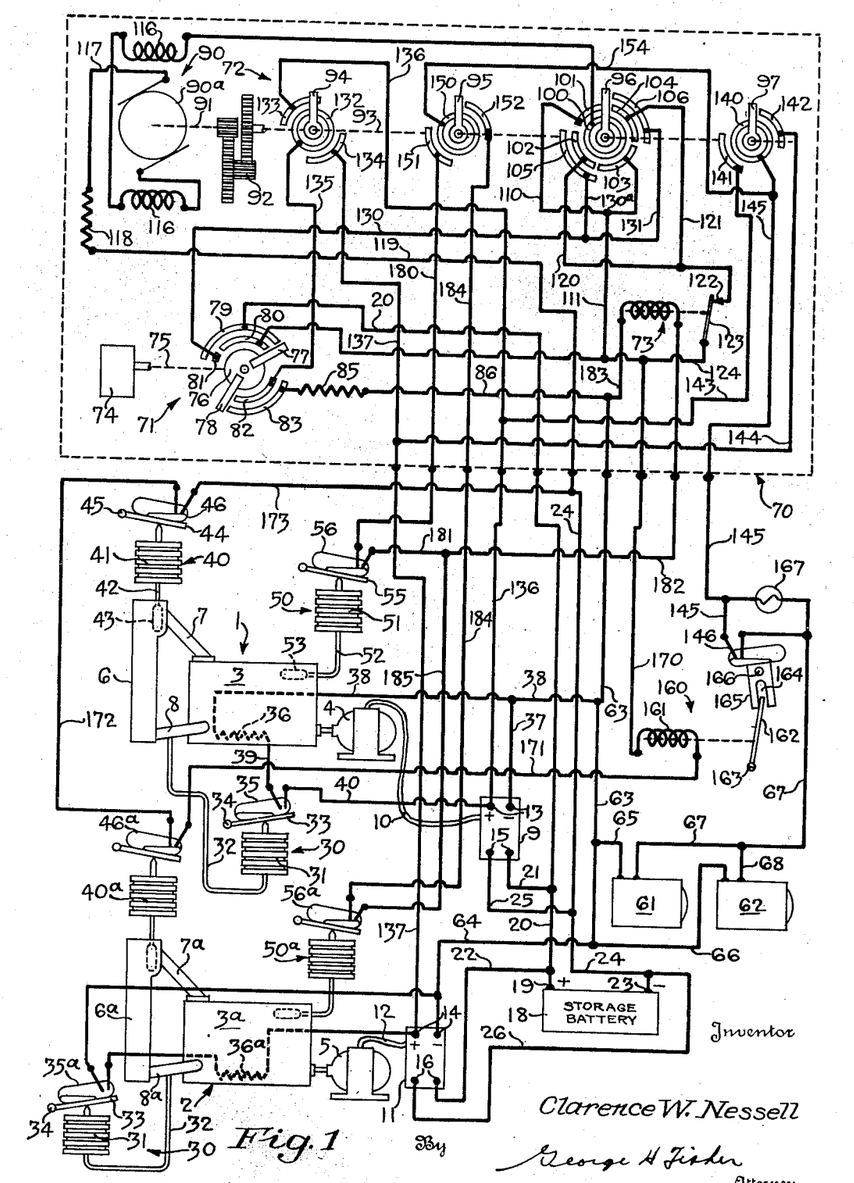
Figure 1 is a diagrammatic view showing one form which my invention may take.

Referring to Figure 1, reference characters 1 and 2 indicate engine driven generating units. Generating unit 1 consists of an internal combustion engine 3 driving an electric generator 4. The generating unit 2 consists of a similar engine 3a driving a generator 5. Internal combustion engine 3 is provided with a radiator 6 and the usual hot and cold water connections 7 and 8 respectively. The engine 3a is provided with a similar radiator 6a, this radiator being connected to the engine by pipes 7a and 8a. Generating unit 1 is provided with the usual control panel 9 while the generating unit 2 is provided with an identical panel 11, these panels containing the usual control switches, relays, circuit breakers, and meters as is well known in the art. Control panel 9 of generating unit 1 is provided with output terminals 13, the left-hand terminal being indicated as positive and the right-hand terminal being indicated as negative. The control panel 11 of generating unit 2 is provided with output terminals 14 which are identical with terminals 13 of panel 9.

The generating units 1 and 2 are preferably provided with starting mechanism of the type which acts to automatically start the units whenever a load is thrown across the output terminals of the control panels. This type of starting mechanism is well known in the art and forms no part of my invention. Hence no detailed disclosure of this type of starting mechanism is necessary here. For starting purposes the control panels 9 and 11 are provided with battery terminals 15 and 16, respectively. These battery terminals are connected to a storage battery 18. The left-hand or positive terminal 19 of storage battery 18 is connected by wires 20 and 21 with the right-hand battery terminal 15 of control panel 9. This same battery terminal is also connected by wires 20 and 22 with the right-hand battery terminal 16 of control panel 11. The right-hand or negative terminal 23 of storage battery 18 is connected by wires 24 and 25 with the left-hand battery terminal 15 of control panel 9, and is also connected to the left-hand battery terminal 16 of control panel 11 by a wire 26. Whenever a load is placed across the output terminals of either unit, the starting mechanism for that unit will act to connect battery 18 to the generator of that unit to cause said generator to run as a motor for starting its engine. The control mechanism for each unit is also such that the unit will be maintained in operation so long as a load is placed across the generator terminals. When the load is removed, the control mechanism acts to automatically stop the engine. In other words a load is thrown across the generator terminals of either unit, the control mechanism for that unit will cause the unit to start and run until the load is taken off the generator, at which time the unit will stop.

In order to maintain the motors 3 and 3a above a predetermined temperature during cold weather, each motor is provided with a thermostat generally indicated at 30. The thermostats 30 each consist of an expansible bellows 31 connected by a tube 32 to a thermostatic element, not shown, located in the cold water pipe 8 or 8a. The bellows 31, tube 32, and thermostatic element are filled with a suitable volatile fluid as is well known in the art. Mounted above the expansible bellows 31 of each thermostat is a mercury switch carrier 33 pivoted at 34. Upon the mercury switch carrier 33 of generating unit 1 is mounted a mercury switch 35 of known form. The mercury switch carrier 33 of generating unit 2 carries a similar mercury switch 35a. In the crank case of engine 3 is located a heating element 36, a similar heating element 36a being located in the crank case of engine 3a. One terminal of heating element 36 is connected to the negative output terminal of control panel 9 by wires 37 and 38. The other terminal of heating element 36 is connected to one contact of mercury switch 35 by a wire 39. The other terminal of mercury switch 35 is connected by a wire 40 to the positive output terminal 13 of control panel 9. The heating element 36a is similarly connected to mercury switch 35a and to the positive output terminals 14 of control panel 11. The arrangement is such that should the temperature of the water of engine 3 fall below a predetermined value, the bellows 31 of thermostat 30 will contract sufficiently to cause tilting of mercury switch to closed position. This will complete a circuit from the positive terminal 13 of control panel 9 through wire 40, mercury switch 35, wire 39, heating element 36, wire 38 and wire 37 to the negative terminal of control panel 9. The heating element 36 will thus be thrown across the generator output terminals 13. The control mechanism for generating unit 1 will then act to cause starting of the engine 3, the output of the generator 4 causing the heating of heating element 36. Engine 3 will then run to warm up, and during this running period its output will be consumed by the heating element 36 which acts to heat the oil in its crank case. As the motor warms up, the pressure within the thermostatic element 8 will increase, this pressure acting through the tube 32 to cause expansion of the bellows 31, this in turn causing tilting of the mercury switch towards open position. When the engine temperature reaches a predetermined value the mercury switch 35 will be tilted sufficiently to cause opening of the circuit. This will take the load of heating element 36 off the generator output terminals 13, which in turn will cause stopping of the unit. In a similar manner, the heating element 36a of engine 3a will be thrown across the generator output terminals 14 whenever the temperature of that engine falls below a predetermined value, and will cause operation of said engine and heating of the oil in the crank case thereof until the engine temperature reaches a predetermined value, at which time the engine will be stopped by opening of mercury switch 35a. It will be seen, therefore, that the thermostats 30 of each unit act to prevent the temperature of these units from falling below a predetermined minimum temperature in order to insure ready starting of the units in cold weather.

Located in the water reservoir of the radiator 6 of generating unit 1 is a thermostat generally indicated at 40. This thermostat comprises an expansible and contractable chamber or bellows 41 connected by means of a tube 42 to the thermostatic element 43 located in the radiator. Chamber 41, tube 42 and element 43 are filled with a suitable volatile fluid as is well known in the art. A mercury switch carrier 44 is mounted above the chamber 41 and is pivoted at 45, this mercury switch carrier having mounted thereon a mercury switch 46. When the temperature in the radiator 6 is below a predetermined value the switch carrier 44 will assume the position shown. Upon rise in temperature, however, the bellows 41 will expand due to increase in pressure of the volatile fluid in thermostatic element 43, this causing tilting of the mercury switch 46 towards open position. When the temperature reaches a predetermined value the mercury switch will be tilted sufficiently to cause opening of its contacts. A thermostatic switch 40a similar to the thermostat 40 is provided for the radiator 6a and engine 3a. The construction and operation of thermostatic switch 40a is identical with that of thermostat 40. The purpose of thermostats 40 and 40a will appear as this description proceeds.

The engine 3 is also provided with a thermostat generally indicated at 50. Thermostat 50 is similar in construction to thermostat 40, it being provided with an expansible and contractable bellows 51, a tube 52, and a thermostatic element 53 responsive to the engine temperature. Actuated by the bellows 51 is a mercury switch 56 which is carried by a switch carrier 55. The arrangement of thermostat 50 is such that when the engine temperature is below a predetermined value, the bellows 51 will be contracted sufficiently to cause closure of the switch. When, however, the engine temperature becomes too high for safe operation, the bellows 51 will expand sufficiently to cause opening of the mercury switch. The engine 3a of generating unit 2 is provided with a similar thermostat 50a, the construction and operation of which is identical with that of thermostat 50.

Reference characters 61 and 62 indicate beacon lights such as used for airport landing fields. These beacon lights are connected in parallel. The negative output terminals of control panels 9 and 11 are connected together and to one terminal of beacon lights 61 and 62. Tracing these connections, the negative terminal 13 is connected by wires 37, 38, 63 and 64 to the negative terminal 14 of control panel 11. The left-hand terminal of beacon 61 is connected by a wire 65 to wire 63 while the left-hand terminal of beacon 62 is connected to the junction of wires 63 and 64 by a wire 66. The other terminals of the beacons 61 and 62 are connected together by wires 67 and 68, the wire 67 leading to the output terminal of clock control mechanism 70 in a manner to be hereafter described.

The function of the clock control mechanism 70 is to start either unit 1 or unit 2 at approximately sundown to cause lighting of the beacons 61 and 62, and to shut down the unit at sunrise. This clock mechanism further functions to operate units 1 and 2 alternately, that is, to operate unit 1 during one night and to operate unit 2 during the following night. The clock mechanism further functions in case of failure of one engine to start the idle engine. The mechanism for performing these functions will now be described in detail. In general it comprises a clock switch mechanism generally indicated at 71, a time and recycling mechanism generally indicated at 72, and a potential relay 73.

The clock switch mechanism 71 comprises a suitable timing mechanism 74 having a shaft 75 upon which is mounted a disc 76 formed of insulating material. Mounted upon disc 76 is a first switch arm 77 and a second switch arm 78. The timing mechanism 74 is designed to rotate the shaft 75 and the disc 76 in a counter-clockwise direction one revolution every 24 hours. Cooperating with the switch arm 77 are arcuate contact segments 79, 80 and 81. Contact segments 79, 80 and 81 are suitably mounted and insulated from each other and the contact segment 79 subtends an arc equal to the arc subtended by the combined contact segments 80 and 81. The arrangement is such that as the disc 76 is rotated in a counter-clockwise direction, the switch arm 77 will first engage contacts 79 and 80. Upon continued movement of switch arm 77 it will disengage from contact 80 and engage with contact 81 thus breaking the connection between contacts 79 and 80 and connecting contact 79 with contact 81. The switch arm 78 is arranged to cooperate with two arcuate contact segments 82 and 83. It is to be understood that contacts 79, 80 and 81 are displaced axially of contacts 82 and 83 to prevent the switch arm 77 from engaging contacts 82 and 83, and to prevent the switch arm 78 from engaging the contacts 79, 80 and 81. The spacing of the contact arms and various contact segments is such that the switch arm 77 will engage contacts 79 and 80 at the same time that switch arm 78 engages contacts 82 and 83, the setting of disc 76 on shaft 75 being such that this action will occur at sunset. The contact segment 79 is connected by means of the wire 20 with the positive terminal 19 of the storage battery 18. The switch arm 77 together with contacts 79 and 80 thus comprises a battery switch for disconnecting the storage battery 18 from the control device to be hereafter described during the daytime. The contact segment 83 is connected to a resistance 85, the other terminal of this resistance being connected by wire 86 to wire 63 which leads to the negative output terminals of control panels 9 and 11. The contact segment 82 is connected through a selector switch to be hereafter described, which switch connects segment 82 with one or the other of the positive output terminals of control panels 9 and 11. The switch arm 78 and the contacts 82 and 83 thus form a switch for disconnecting the starting resistance 85 from the control panels during the daytime and permitting connection of the starting resistance therewith at sunset and during the night.

The timing or recycling mechanism 72 consists of a direct current series wound motor 90, the armature 90a of which is connected to a shaft 91. Mounted upon the shaft 91 is a gear train indicated at 92, the last gear of which drives a shaft 93. Mounted upon shaft 93 are switch arms 94, 95, 96 and 97. Cooperating with the switch arm 96 to form a motor control switch are a plurality of arcuate and concentrically spaced contact segments. The innermost contact segment 100 is of annular shape and is arranged to be contacted by switch arm 96 throughout the entire 360 degrees of rotation of said switch arm. Radially spaced from the annular contact 100 are four arcuate contact segments 101, 102, 103 and 104, these segments being disposed respectively in the first, second, third and fourth quadrants. The arrangement of these contact segments is such that when the switch arm 96 is in a vertically upward position it engages the contact segment 101. When the contact arm 96 is rotated counter-clockwise through an angle of 90 degrees to a horizontal position, it disengages contact 101 and engages contact 102. Upon movement of arm 96 through another 90 degrees to a vertically downward position it disengages contact 102 and engages the contact segment 103. Upon movement of the switch arm through another 90 degree angle it disengages contact segment 103 and engages the segment 104. Mounted in the same quadrants with the contact segments 102 and 104 and radially spaced therefrom are arcuate contact segments 105 and 106, the purpose of which will become apparent later. The contact segments 101 and 103 are connected together by a wire 110, this wire being connected by wires 111 and 112 to the contact segment 80 of the switching mechanism 71. As pointed out hereinbefore, the contact segment 79 is connected to the positive terminal 19 of storage battery 18. Therefore, when switch arm 77 engages contacts 79 and 80 it connects the contacts 101 and 103 to the positive terminal of the storage battery. The contact segment 100 is connected by a wire 115 to the series field 116 of the driving motor. The other terminal of the driving motor is connected by a wire 117 to a resistance 118, the other end of resistance 118 being connected by wires 119 and 24 to the negative terminal 23 of the storage battery 18. The contact segments 102 and 104 are connected together by wires 120 and 121, the wire 120 leading to the contact 122 of the potential relay 73. The switch arm 123 of potential relay 73 is connected by wires 124 and 112 to the contact segment 80 of the battery switch. It will be seen, therefore, that when the switch arm 123 of the potential relay 73 engages the contact 122 the arcuate contact segments 102 and 104 are connected to the positive side of the storage battery along with the contact segments 101 and 103.

With the parts in the position shown, (assuming switch arm 77 to be engaging contact segments 79 and 80), an energizing circuit for the motor will be completed, this circuit being traced as follows: positive terminal 19 of storage battery 18, wire 20, contact segment 79, switch arm 77, contact segment 80, wire 112, wire 111, wire 110, contact segment 101, switch arm 96, annular contact 100. wire 115, series fields 116, armature 90a, wire 117, resistance 118, wire 119 and wire 24 to negative terminal 23 of the storage battery. This will cause rotation of the motor in a direction to rotate the switch arm 96 (and also contact arms 94, 95 and 97) in a counter-clockwise direction. When the switch arm 96 is rotated through an angle of 90 degrees, it rides off contact segment 101 and engages the contact segments 102 and 105. Unless at this time the potential relay switch arm 123 is engaging contact 122 the motor driving circuit will be broken thus causing the motor to stop with the switch arm 96 in a horizontal position between the first and second quadrants. If, however, the contact arm 123 of the potential relay 73 is engaging contact 122, a circuit will be completed from wire 112 through switch arm 123, contact 122 and wire 120 to the contact segment 102. This will cause energization of the driving motor through the switch arm 96 and contact 100, and the motor will thus continue to operate until either the potential relay is opened or until the switch arm 96 rides off contact segment 102 and engages the contact segment 103. However, in the latter case, as the contact segment 103 is connected directly to the battery switch by wires 110, 111 and 112 in the same manner as contact segment 101, the motor will continue to be energized and will rotate through another 90 degrees until switch arm 96 rides off contact segment 103 and rides upon the contact segments 104 and 106. As the contact segment 104 is connected in parallel with segment 102 the action will be the same when switch arm 96 rides from contact segment 103 to contact segment 104 as occurred previously when the contact arm 96 rode from contact 101 to contact 102. That is, the motor will stop unless the switch arm 123 of potential relay 73 is in engagement with the contact arm 122. It should therefore be apparent that the switch arm 96 and the contact segments 100 to 104 comprise a controlling switch for the driving motor, this switch acting to cause the driving motor to stop with the switch arm 96 in a horizontal position or in the second or fourth quadrants in the event that the potential relay 73 is open, or to cause continuous rotation of shaft 93 and switch arm 96 in the event that the potential relay remains closed. The contact segments 105 and 106 are connected together by means of wires 130a and 131 which are connected to the wire 138 leading to the contact segment 81 of the clock switch mechanism 71. The purpose of these contacts and the connections described will be stated in detail under "Operation".

The switch arm 94 cooperates with an annular contact 132 and two arcuate contact segments 133 and 134. Contact segment 133 is located in the first quadrant and is arranged to be contacted by switch arm 94 when said arm is in a vertical position as illustrated. The contact segment 133 is also arranged so that when switch arm 94 is moved through an angle of 90 degrees to a horizontal position it just disengages contact segment 133. The contact segment 134 is located in the third quadrant and is arranged so that when switch arm 94 moves to a vertical position 180 degrees from that illustrated, it will just engage said contact segment. When switch arm 94 moves through another 90 degrees of rotation to a horizontal position it will just disengage from contact segment 134. The annular contact 132 is connected by a wire 135 to the contact segment 77 of the clock switch mechanism 71. Contact segment 133 is connected by a wire 136 to the positive output terminal of the control panel 9, and the contact segment 134 is connected by wire 137 to the positive output terminal of the control panel 11. Thus when the switch arm 78 of the clock switch mechanism engages the contact segments 82 and 83 and when the switch arm 94 engages contact segments 132 and 133 the starting resistance 85 is connected across the terminals of the control panel 9 of generating unit 1. Similarly, when the switch arm 94 engages the contact segments 132 and 134 the starting resistance is connected across the output terminals 14 of the control panel 11 of generating unit 2. It will be apparent, therefore, that the switch arm 94 and the contact segments 132, 133 and 134 comprise a selector switch for placing the starting load 85 across the output terminals of either generating unit.

The switch arm 97 cooperates with an annular contact 140 and with arcuate contact segments 141 and 142. The contact segment 141 is located in the second quadrant and is arranged to be just contacted by the switch arm 97 when said arm moves counter-clockwise to an angle of 90 degrees from that illustrated. The contact segment 141 is also so arranged that when arm 97 moves to a vertical downward position it will just disengage therefrom. The contact segment 142 is similarly arranged in the third quadrant. The contact segment 141 is connected by wires 143 and 136 to the positive output terminal of the control panel 9 of generating unit 1, while the contact segment 142 is connected by wires 144 and 137 to the positive output terminal of the control panel 11 of generating unit 2. The annular contact 140 is connected by a wire 145 to one terminal of a mercury switch 146. The other terminal of the mercury switch is connected by a wire 67 to the beacons 61 and 62. It should therefore be apparent that when switch arm 97 engages contacts 140 and 141 the beacon lights are connected to the generating unit 1 while when said switch arm engages contacts 140 and 142 the beacons will be connected to generating unit 2. The switch arm 97 and the contact segments 140, 141 and 142 therefore form a switch for placing the beacon light load upon one generating unit or the other, or for disconnecting the beacon lights from both generating units.

The switch arm 95 cooperates with an annular contact 150 and with arcuate contact segments 151 and 152. The contact segments 151 and 152 are located in the second and fourth quadrants respectively and are arranged to be contacted by switch arm 95 when said arm is in a horizontal position or in the second or fourth quadrants. The segments, however, are arranged so that when the switch arm 95 is in a vertical position, there will be no engagement. The functions of the contact segments 150, 151 and 152 and their connection with other elements of the system will be pointed out hereafter under "Operation".

The mercury switch 146 above mentioned forms part of a mercury switch relay generally indicated at 160. This relay comprises a coil 161 cooperating with an armature, not shown, for tilting a lever 162 to and fro. Lever 162 is pivoted at one end at 163 and at its other end engages with a slot 164 of the mercury switch carrier 165. Mercury switch carrier 165 carries the mercury switch 146 and is pivoted at 166. When relay coil 161 is energized it pulls lever 162 in a counter-clockwise direction, this in turn tilting the mercury switch carrier 165 in a clockwise direction to move the mercury switch to open position. When, however, the relay coil 161 is de-energized the lever 162 is moved in a clockwise direction under the action of gravity or springs, not shown. This causes tilting of mercury switch carrier 165 in a counter-clockwise direction, thus tilting the mercury switch 146 to circuit closing position. Shunting the terminals of the mercury switch 146 is a lamp or other form of resistance element 167, the purpose of which will hereafter become apparent.

The left-hand end of the relay coil 161 is connected by a wire 170 to the wire 112 which is in turn connected to the contact segment 80 of the battery switch. In this manner the left-hand end of relay coil 161 is connected to the positive terminal 19 of the storage battery 18 when switch arm 77 of the battery switch engages the contact segments 79 and 80. The right-hand end of the relay coil 161 is connected by a wire 171 to one terminal of the mercury switch 46a of temperature controller 40a located in the radiator of generating unit 2. The other terminal of switch 46a is connected by a wire 172 to one terminal of the mercury switch 46 of the temperature controller 40 located on the radiator of generating unit 1. The other terminal of mercury switch 46 is connected by a wire 173 to wire 24 and hence to the negative terminal of the storage battery 18. As pointed out hereinbefore, the thermostatic controllers 40 and 40a act to maintain the switches 46 and 46a in closed position when the temperature of the corresponding engine is below proper operating temperature. When the temperature of either unit increases to a proper operating value the thermostat 40 or 40a of that unit will act to open its switch. When both machines are below proper operating temperature both switches 46 and 46a will thus remain in closed position. This will complete a circuit through relay coil 161, this circuit being traced as follows: positive terminal 19 of battery 18, wire 20, contact 79, switch arm 77, contact 80, wire 112, wire 170, relay coil 161, wire 171, mercury switch 46a, wire 172, mercury switch 46, wire 173 and wire 24 to the negative terminal of storage battery 18. The resulting energization of relay coil 161 will cause mercury switch 146 to be tilted to open position thereby disconnecting beacons 61 and 62 from both generators except through the resistance element or lamp 167. When, however, the temperature of either unit becomes high enough for proper operation thereof, its thermostatic controller 40 or 40a will open mercury switch 46 or 46a thus deenergizing relay coil 161, causing the mercury switch 146 to be moved to closed position, thereby connecting beacons 61 and 62 to the load wire 146 leading from the clock mechanism 70.

*Operation*

With the parts in the position shown, the switch arm 77 is disengaged from contact segments 79 and 80 and the contact arm 78 is disengaged from contact segments 82 and 83. The starting resistance 85 is therefore not in circuit with the output terminals of either generating unit. Also, the storage battery is disconnected from the driving motor 90 and also from the relay coil 161 of the load relay 160. The load relay coil is thus at this time deenergized and the mercury switch 146 is in closed position. At this time also it will be noted the switch arm 97 of the load selector switch is not engaged with either contact segment 141 or 142. The beacons 61 and 62 are therefore disconnected from the output terminals of both generating units and the generating units are out of operation.

In the position shown, the switch arms 77 and 78 are about to engage their respective contact segments. Shortly before sunset the switch arm 77 will engage contact segments 79 and 80, and simultaneously the switch arm 78 will engage the contact segments 82 and 83. Engagement of switch arm 77 with contact segments 79 and 80 will cause energization of the driving motor 90, the energizing circuit being as follows: positive terminal storage battery 18, wire 20, contact segment 79, switch arm 77, contact segment 80, wire 112, wire 111, wire 110, contact segment 101, switch arm 96, contact 100, wire 115, series fields 116 of motor 90, armature 90a, wire 117, resistance 118, wire 119 and wire 24 to the negative terminal 23 of storage battery 18. Engagement of the switch arm 77 with contacts 79 and 80 will also cause energization of relay coil 161 in the manner pointed out in detail above, this causing opening of mercury switch 146. Simultaneously with the above actions the starting resistance 85 will be thrown across the output terminals 13 of generating unit 1, this circuit being as follows: positive terminal 13, wire 136, contact segment 133, arm 94, contact 132, wire 135, contact segment 82, switch arm 78, contact segment 83, starting resistance 85, wire 86, wire 63, wire 38 and wire 37 to the negative output terminal 13. At this time, therefore, the motor 90 will be rotating shaft 93 and contacts 94, 95, 96 and 97 in a counter-clockwise direction and the starting resistance will be thrown across the output terminals of generating unit 1 causing the generator 4 to operate as a motor to start the engine 3. The speed of motor 90 and the gear train 72 are designed so as to cause a 15 second period to elapse before the switch arm 96 will disengage from contact segment 101 to break the motor operating circuit. When the switch arm 96 rides off contact segment 101 and on to the contact segments 102 and 105, the switch arm 94 will simultaneously ride off contact segment 133 thus disconnecting the starting resistance 85 from the generator terminals. At the same time, however, the switch arm 97 will engage the contact segment 141 this causing the beacons 61 and 62 to be connected across the generator terminals of generating unit 1 through the resistance or lamp 167, this circuit being as follows: positive output terminal 13, wire 136, wire 143, contact segment 141, switch arm 97, contact segment 140, wire 145, lamp 167, wire 67, wire 68, beacon 62, wire 66, and from wire 67 to beacon 61, wire 65, wire 63, wire 38, and wire 37 to negative output terminal 13. It will be seen, therefore, that simultaneously with disconnecting the starting resistance 85 from the generator terminals, the lighting load in series with resistance 167 will be thrown across the generator terminals, this loading causing continued operation of said generating unit.

At the same time as the switch arm 96 moves to horizontal position the switch arm 95 will engage with the contact segment 151. If during the 15 seconds starting interval previously mentioned the motor has started and the generator voltage has come up to the proper value, the relay coil of potential relay 73 will now be energized and this will act to pull the switch arm 123 from the contact 122. The circuit for energizing the potential relay 73 is as follows: positive output terminal 13 of generating unit 1, wire 136, wire 143, contact segment 141, arm 97, contact 140, wire 145, wire 154, contact 150, arm 95, contact segment 151, wire 180, mercury switch 56 of safety controller 50, wire 181, wire 182, coil of relay 73, wire 183, wire 63, wire 38, and wire 37 to the negative output terminal 13 of generating unit 1. If the terminal voltage of the generator has caused relay 73 to pull in and disengage switch arm 123 from contact 122 by the circuit just mentioned, the contact 102 will be deenergized. Therefore, when contact arm 96 moves from contact 100 to the dead contact 102 the energizing circuit for the motor 90 will be broken and the motor will stop at this point, thus causing continuous operation of generating unit 1.

If, however the voltage fails to build up during the 15 second starting period, the potential relay 73 will not be energized. The switch arm 123 therefore would continue to engage contact 122, this connecting the contact segment 102 with the positive side of the storage battery in the manner previously described. Therefore, when switch arm 96 rides off contact 101 and on to contact 102, the motor 90 will continue to be energized, and the rotation of shaft 93 and the switch arms 94, 95 and 96, and 97 will continue. At this time, it will be remembered that the starting resistance has been cut out by disengagement of switch arm 94 from contact 133, and the beacons 61 and 62 in series with lamp 167 have been thrown across the generator output terminals 13. This condition will exist for the fifteen seconds required for the switch arms to be rotated through the second quadrant. Due to the lamp 167 being connected in series with the beacons 61 and 62 at this time, the beacon light load is not placed on the generators. Hence this second fifteen second period permits the engine 1 to start if it did not start during the fifteen second starting period, and also gives an additional time in which the generator voltage may build up if the engine had started in the first period but no voltage had built up. If lamp 167 were not in series with the beacons 61 and 62, the full lighting load would have been thrown across the generator terminals during this second fifteen second period. While this would be somewhat satisfactory in warm weather, it would be entirely unsatisfactory in cold weather, as the engine 3 would be below proper operating temperature and would stall instead of assuming the load. Also without lamp 167 in series with the beacons 61 and 62, this second fifteen second period would not be an additional starting period as the engine would be incapable of starting under load. It will be seen therefore that the arranging of lamp 167 in series with the beacons provides an additional period in which the engine may start, and further provides a period in which the generator voltage may build up without assumption of load, in the event that the engine started during the first fifteen second period, and the generator voltage failed to immediately build up. If during the second fifteen second period, the generator voltage builds up, the potential relay coil will be energized, this causing opening of the operating circuit of motor 90 and stopping of rotation of shaft 93 and the switch arms 94, 95, 96, and 97, this permitting continuous operation of generating unit 1.

Should motor 3 fail to start or to continue to operate with the lamp load during this second 15 second period, the relay coil 73 will continue to be deenergized thus causing switch arm 123 to remain in engagement with contact 122 which in turn causes motor 90 to be operated. When switch arm 96 disengages contact segment 102 it rides upon the contact segment 103. As the contact segment 103 is connected in parallel with the contact segment 101, the motor 90 will be energized independently of the voltage relay. At the same time that switch arm 96 rides off contact segment 102 and rides upon contact 103, the switch arm 94 will engage the contact segment 134, the switch arm 95 will disengage the contact segment 151, and the switch arm 97 will disengage the contact segment 141. Engagement of switch arm 94 with contact segment 134 will place the starting resistance 85 across the output terminals 14 of generating unit 2 by the following circuit: positive output terminal 14, wire 137, contact segment 134, switch arm 94, contact 132, wire 135, contact 82, switch arm 78, contact 83, starting resistance 85, wire 86, wire 63 and wire 64 to the negative output terminal 14. Disengagement of switch arm 97 from contact 141 will break the load circuit across the output terminals of the generating unit 1. It should therefore be apparent that when switch arm 96 rides upon the contact 103 the load will be disconnected from generating unit 1, and the starting resistance 85 placed across the output terminals of generating unit 2. The engagement of switch arm 96 with contact 103 therefore provides a 15 second starting period for generating unit 2 of exactly the same nature as described in connection with generating unit 1.

It should be noted that at the end of this 15 second starting period, the switch arm 94 will ride off contact 134 thereby breaking the starting resistance circuit. Simultaneously the switch arm 97 will ride upon the contact 142 thus placing the lighting load in series with the lamp bulb or resistance 167 across the output terminals of generating unit 2. If during this 15 second starting period the generating unit 2 has started, the voltage relay 73 will be energized by the following circuit: positive output terminal 14, wire 137, wire 144, contact 142, switch arm 97, contact 140, wire 145, wire 154, contact 150, switch arm 95, contact 152, wire 184, mercury switch 56a, wire 185, wire 182, relay coil 73, wire 183, wire 63 and wire 64 to negative output terminal 14. Energization of relay coil 73 will cause deenergization of the contact 104. Therefore when switch arm 96 rides upon contact 104, the motor 90 will stop. At this time, therefore, the generating unit 2 will be left in operation.

If instead of starting during the first 15 second period the generating unit 2 fails to start or if the generator voltage fails to build up, the relay coil 73 will not be energized and the contact segment 104 will therefore be energized, this causing further operation of motor 90 and providing a second 15 second period in which engine 3a may start, and/or in which the generator voltage may build up, this period being of exactly the same nature as the corresponding period for generating unit 1, which has been previously described from motor 2. If during this period the motor starts and/or the voltage builds up, the relay coil 73 will be energized thereby deenergizing contact 104 and causing motor 90 to stop, thus permitting continuous operation of generating unit 2. Should generating unit 2 fail to start during this 15 second period, the switch arms 94, 95, 96 and 97 will reassume the position shown in the drawings thereby again attempting to start generating unit 1.

It should be apparent that if either generating unit 1 or 2 is operating and then for some reason fails, the generator terminal voltage will fall, thus deenergizing the relay coil 73, this causing the clock 70 to recycle to cause starting of the other generating unit. It should also be apparent that the energizing circuit for relay coil 73 will be caused by the selector switch 90 to pass through the mercury switch 56 or 56a of the safety controllers 50 or 50a. Thus should the engine of the generating unit in operation overheat, the energizing circuit for relay coil 73 will be broken this causing recycling of the apparatus to start the other generating unit.

From the foregoing it will be apparent that the system at sunset will operate to start either the generating unit 1 or the generating unit 2. It should also be apparent that when either generating unit 1 or the generating unit 2 is in operation, the switch arm 96 will be engaging either the contact segment 105 or the contact segment 106. These contact segments are provided for the purpose of shutting down whichever unit happens to be operating at sunrise, which operation will now be described in detail. At sunrise the switch arm 78 will disengage from the contact segments 82 and 83 thereby completely disconnecting the starting resistance 85 from each generating unit regardless of the position of the starting load selector 94. At the same time the switch arm 77 will ride off the contact segment 80, this action disconnecting the positive terminal 19 of the storage battery 18 from the contact segments 101 and 103. A short time thereafter, the switch arm 77 will engage the contact 81. This will complete an energizing circuit for motor 90 as follows: positive terminal 19 of storage battery 18, wire 20, contact segment 79, switch arm 77, contact 81, wire 130, wire 130a or 131, contact segment 105 or 106, switch arm 96, contact 100, wire 115, motor 90, choking resistance 118, wire 119 and wire 24 to the negative terminal 23 of storage battery 18. This will cause motor 90 to be operated until the switch arm 96 disengages the contact 105 or 106 (whichever it happened to be on). As the contacts 101 and 103 have now been deenergized by disengagement of switch arm 77 from contact 80, the motor 90 will stop with the switch arms 94, 95, 96 and 97 in a vertical position. In such position the switch arm 97 disconnects the beacons from both generators, and the switch arm 94 is set for connecting the starting resistance across the generating unit which had not previously been operating so that such unit may be started at sunset.

As indicated hereinbefore, the load relay 160 acts to prevent the beacons 61 and 62 from being directly connected across the generating terminals of the unit which happens to be operating until the temperature of the engine driving that unit has raised sufficiently to permit such engine to assume the lighting load without stalling. As pointed out previously, the relay coil 161 of the load relay 160 is connected in series with the mercury switches 46 and 46a of the temperature responsive devices 40 and 40a, these devices being arranged so that their switches remained closed so long as the temperature of their respective engines is below a proper operating value. When, however, the temperature of the generating unit which is operating reaches a proper value, the mercury switch 46 or 46a will be moved to open position thus breaking the energizing circuit for relay coil 161. This will cause lever 162 to be moved in a counterclockwise direction under the action of gravity or springs, not shown, thereby tilting the mercury switch 146 to closed position, this shunting out the resistance or lamp 167 and connecting the beacons directly across the terminals of the operating generating unit. It should therefore be apparent that the entire load of the beacons 61 and 62 cannot be connected across the terminals of the operating generating unit until the temperature of that unit has reached a proper operating value. By this arrangement stalling of a started generating unit due to the lighting load being thrown upon it too early is prevented.

It should be noted that due to the relay coil 161 of load relay 160 being connected by wires 170 and 112 to the battery switch formed by switch arm 77 and contacts 79 and 80, the relay 160 will be completely deenergized whenever the battery switch is open. Therefore, when the clock mechanism is not calling for engine operation, there can be no flow of current in the load relay energizing circuit, and hence there is no drain on the battery 18 when neither unit is in operation. It should also be noted that due to use of a relay which is normally closed as the load relay 160, this relay need be energized only during the warming up period of one of the engines 3 or 3a. The current consumption by relay 160 therefore will be a minimum.

Figure 2:
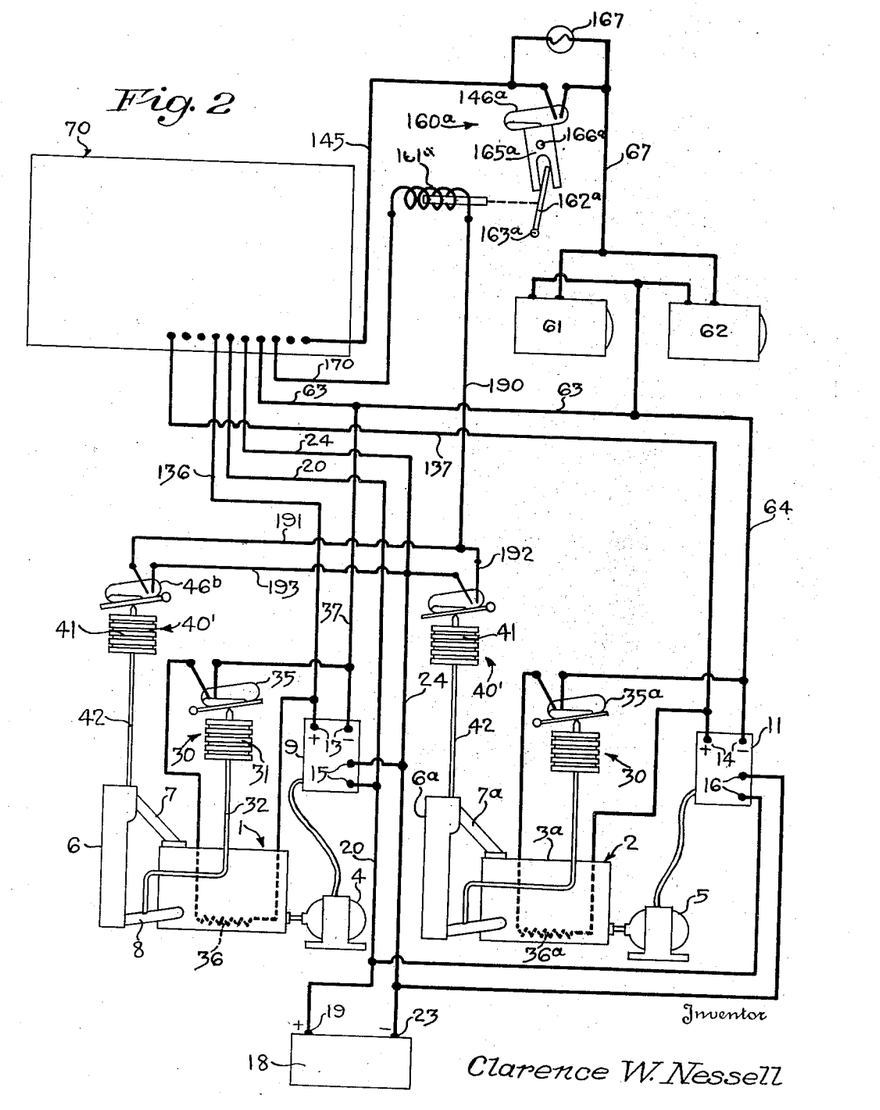
Figure 2 is a diagrammatic view of a modification.

Referring now to Figure 2, this figure shows a system identical with that illustrated in Figure 1, with the exception that the arrangement of the load relay and the controllers therefor is somewhat modified. In this figure the connections inside the clock mechanism 70 have not been illustrated for the reason that such has been described in detail in connection with Figure 1. Also the controllers 50 and 50a and their connections with the clock mechanism 70 have been omitted for the sake of clearness in illustration. It will be understood, however, that these controllers will be connected in the same manner shown in detail in Figure 1.

The load relay 160a which is interposed in the wire 145 leading to the beacons 61 and 62 and which corresponds to the load relay 160 of Figure 1 is similar in construction to said relay 160 except that it is arranged so that the mercury switch 146a is in open position when the relay coil 161a is deenergized. When the relay 161a is energized, it causes the lever 162a to be moved in a counterclockwise direction about its pivot 163a, this causing the mercury switch carrier 165a to be tilted about its pivot 166a to move the mercury switch 146a to closed position.

The generating unit 1 is provided with a thermostat 40' which corresponds to the thermostat 40 in Figure 1, and the generating unit 2 is provided with a similar thermostat which corresponds to thermostat 40a of Figure 1. These thermostats each consist of the same elements as pointed out in connection with the thermostats 40 and 40a of Figure 1. The arrangement of thermostats 40', however, is reversed from the corresponding elements of Figure 1, in that the mercury switches 46b and 46c are arranged to be in open position whenever the temperature of the unit to which the controllers are respectively attached is below a proper operating value.

The left-hand end of the relay coil 161 is connected by a wire 170 to the clock 70, this arrangement being exactly the same as illustrated in Figure 1. The right-hand end of relay coil 161a, however, is connected by wires 190, 191 and 192 to one terminal of each of the mercury switches 46b and 46c. The other terminals of said mercury switches are connected by wire 193 to the wire 24 which leads to the negative terminal 23 of the storage battery 18. It should thus be apparent that the mercury switches 46b and 46c are connected in parallel with respect to the relay coil 161a. Therefore, when both engines are cold, both mercury switches 46b and 46c will be in open position, this resulting in the relay coil 161a being deenergized. At this time the mercury switch 146a will be in open position this placing the resistance 167 in series with the beacons 61 and 62, thereby preventing the full lighting load from being thrown across the output terminals of the operating generating unit.

When however, the temperature of the engine of the operating unit reaches a proper value, either the mercury switch 46b or the mercury switch 46c will be moved to closed position, this causing the relay coil 161 to be energized. This causes tilting of mercury switch 146a to closed position, thereby directly connecting the beacons 61 and 62 to the operating unit. It should therefore be apparent that this arrangement will likewise prevent beacons 61 and 62 from being directly connected to whichever generating unit is started until the temperature of that unit has reached a proper operating value.

It will be apparent that many changes will suggest themselves to those skilled in the art, and therefore I wish to be limited only by the scope of the appended claims and the prior art.

I claim as my invention:

1. In a system of the class described, a prime mover, load means actuated by said prime mover, variable power transmission means interposed between said prime mover and said load means for transmitting power from said prime mover to said load means, automatic starting means for said prime mover, a controller for said variable power transmission means, means for automatically responding to an internal condition within the prime mover which is indicative of the prime mover's ability to operate satisfactorily (as distinguished from an output condition of said prime mover) said last mentioned means actuating said controller for the variable power transmission means and being arranged to position said controller in a manner to diminish the transmission of power from said prime mover when said condition is at a value indicating that the engine is not in condition for satisfactory operation, while increasing the transmission of power from said prime mover to a maximum when said condition is at a value indicating that the engine is in condition for satisfactory operation.

2. In a system of the class described, a prime mover of the internal combustion type, load means actuated by said prime mover, starting means for said prime mover, means for selectively connecting said load means to said prime mover and for disconnecting said load means therefrom, said last mentioned means including a thermostat responsive to the temperature of said prime mover, said thermostat being arranged to at least partly disconnect said load means from the prime mover until the temperature of said prime mover reaches a predetermined value.

3. In an automatic lighting system, in combination an engine driven generator unit, starting means for said engine of the type actuated by the placing of a load across the terminals of said generator, a lighting unit, a circuit for connecting said lighting unit with said generator to energize said lighting unit, a starting resistance, a circuit for connecting said starting resistance across said generator to cause starting of said engine, a selector switching mechanism arranged to selectively open one of said circuits and close the other, automatic means for positioning said switching mechanism to close the circuit through said starting resistance when said engine is out of operation, and for positioning said selector switching mechanism to close the circuit through the lighting unit when said engine is in operation, a main switching mechanism for opening both of said circuits to place said engine out of operation, timing means for controlling said main switching mechanism to cause operation of said engine at predetermined times, and means responsive to an operating condition of said engine for preventing complete connection of said lighting unit with said generator until the operation of said engine is sufficiently satisfactory to carry the load imposed thereon by said lighting unit.

4. In a system of the class described, in combination an engine driven generator unit, starting means for said engine of the type actuated by the placing of a load across the generator terminals, a main electrical loading means for said generator, a circuit for connecting said loading means to said generator, a starting resistance, a circuit for connecting said starting resistance across said generator to cause starting of said engine, switching means for said circuits for opening both circuits or selectively placing said starting resistance or said main load across said generator terminals, timing means for controlling said switching means to place said generator into or out of operation, and means responsive to an operating condition of said engine for preventing complete connection of said main load across said generator until the operation of the engine is sufficiently satisfactory to carry the load imposed thereon by said main loading means.

5. In a system of the class described, in combination, an engine driven generator unit, starting means for said engine of the type actuated by the placing of a load across the generator terminals, a main electrical loading means for said generator, a circuit for connecting said loading means to said generator, a starting resistance, a circuit for connecting said starting resistance across said generator to cause starting of said engine, switching means for said circuits for opening both circuits or selectively placing said starting resistance or said main load across said generator terminals, timing means for controlling said switching means to place said generator into or out of operation, and means responsive to the temperature of said engine for preventing complete connection of said main load to said generator until the engine temperature has reached a predetermined value.

6. In a system of the class described, in combination, an engine driven generator unit, control means for said generator unit of the type causing starting of said engine when a load is placed across the generator terminals and causing stopping of the engine when the load is removed, loading means for said generator, a circuit for connecting said loading means to said generator, a starting resistance, a circuit for connecting said starting resistance across the generator to cause starting of said engine, a selector switch mechanism arranged when in starting position to open the load circuit and to close the starting resistance circuit, and when in running position to open the starting resistance circuit and to close the load circuit, automatic means for positioning said selector switch mechanism, a main switching mechanism for opening both of said circuits regardless of the position of said selector switch mechanism to place said engine into or out of operation, timing means for controlling said main switching mechanism to automatically place said generator into and out of operation at predetermined times, a switch in said load circuit, means responsive to an operating condition of said engine for holding said switch open until the operation of the engine is sufficiently satisfactory to carry the load, and resistance means shunting said switch for imposing a slight load on said generator when said switch is open to retain said generator unit control means in running position.

7. In a system of the class described, in combination, an engine driven generator unit, control means for said generator unit of the type causing starting of said engine when a load is placed across the generator terminals and causing stopping of the engine when the load is removed, loading means for said generator, a circuit for connecting said loading means to said generator, a starting resistance, a circuit for connecting said starting resistance across the generator to cause starting of said engine, a selector switch mechanism arranged when in starting position to open the load circuit and to close the starting resistance circuit, and when in running position to open the starting resistance circuit and to close the load circuit, automatic means for positioning said selector switch mechanism, a main switching mechanism for opening both of said circuits regardless of the position of said selector switch mechanism to place said engine into or out of operation, a switch in said load circuit, means responsive to an operating condition of said engine for holding said switch open until the operation of the engine is sufficiently satisfactory to carry the load, and means for imposing a slight load on said generator when said switch is open to prevent said control means for said generator unit from causing stopping of said unit when said switch is open.

8. In a system of the class described, in combination, an engine driven generator unit, control means for the engine of said unit of the type causing said engine to automatically start when a load is placed across the generator and to stop when the generator load is removed, automatic means for loading the generator, switching mechanism in the load circuit, means responsive to an operating condition of the engine for closing said switching mechanism when the operation of said engine is sufficiently satisfactory to carry the load, and auxiliary loading means controlled by said switching mechanism for preventing said engine control means from stopping the engine when said switching mechanism is open.

9. In a system of the class described, in combination, an engine driven generator unit, control means for the engine of said unit of the type causing said engine to automatically start when a load is placed across the generator and to stop when the generator load is removed, automatic means for loading the generator, switching mechanism in the load circuit, means responsive to the temperature of the engine for closing said switching mechanism when the temperature of said engine reaches a predetermined value, and auxiliary loading means controlled by said switching mechanism for preventing said engine control means from stopping the engine before closure of said switching mechanism.

10. In a system of the class described, in combination, an engine driven generator unit, control means for the engine of said unit of the type causing said engine to automatically start when a load is placed across the generator and to stop when the generator load is removed, automatic means for loading the generator, switching mechanism in the load circuit, means responsive to an operating condition of the engine for closing said switching mechanism when the operation of said engine is sufficiently satisfactory to carry the load, and auxiliary loading means for preventing said engine control means from stopping the engine when said switching mechanism is open.

11. In a system of the class described, in combination, a prime mover of the internal combustion type, a generator connected to said prime mover to be driven thereby, means for controlling the load carried by said generator, means responsive to the temperature of said prime mover for positioning said controlling means, said temperature responsive means cooperating with said controlling means to cause said generator to assume no more load than can be satisfactorily carried by said prime mover to prevent stalling thereof.

12. In a system of the class described, in combination, a prime mover, a generator connected to said prime mover to be driven thereby, means for controlling the load carried by said generator, said controlling means comprising a normally open switch in the load circuit, and means responsive to the temperature of said prime mover for closing said switch when the temperature of said prime mover rises above a predetermined value.

13. In a system of the class described, in combination, a first engine driven generating unit, a second engine driven generating unit, a common electrical load for the two generating units, means for selectively starting the engine of either unit, means for selectively connecting said load to either generator, said selective connecting means acting to connect the load to the unit selected by said starting means, and means including a device responsive to an operating condition of engine of the selected unit for preventing complete connection of the load to the selected unit until the operation of the engine is sufficiently satisfactory to enable it to carry the load.

14. In a system of the class described, in combination, a first engine driven generating unit, a second engine driven generating unit, a common electrical load for the generating units, means for selectively starting the engine of either unit, means for selectively connecting said load to either generator, said selective connecting means acting to connect the load to the unit selected by said starting means, and means including a device responsive to the temperature of the engine of the selected unit for preventing complete connection of the load to the selected unit until the temperature of the engine reaches a predetermined value.

15. In a system of the class described, a first internal combustion engine, a second internal combustion engine, means for selectively starting either engine, load means, means for selectively connecting said load means to either engine, said selective connecting means acting to connect said load means to the engine selected by said starting means and including a device responsive to an operating condition of the selected engine for preventing connection of the load means to said engine until the operation of the latter is sufficiently satisfactory to carry the load imposed by said load means.

16. In a system of the class described, a first internal combustion engine, a second internal combustion engine, means for selectively starting either engine, load means, means for selectively connecting said load means to either engine, said selective connecting means acting to connect said load means to the engine selected by said starting means and including a device responsive to the temperature of the selected engine for preventing connection of the load means to said selected engine until the temperature of the latter reaches a predetermined value.

17. In a system of the class described, in combination, a first engine driven generator unit, a second engine driven generator unit, a common electrical load for the two generating units, means for selectively starting the engine of either unit, means for selectively connecting said load to either generator, said selective connecting means acting to connect the load to the unit selected by said starting means, and means for preventing the load from being completely connected to said selected unit until the engine of said unit reaches a proper operating condition, said last named means comprising a normally open switch in the load connecting means, and control means for said switch for closing said switch upon either engine reaching a proper operating condition.

18. In a system of the class described, in combination, a first engine driven generator unit, a second engine driven generator unit, a common electrical load for the two generating units, means for selectively starting the engine of either unit, means for selectively connecting said load to either generator, said selective connecting means acting to connect the load to the unit selected by said starting means, and means for preventing the load from being completely connected to said selected unit until the engine of said unit reaches a proper operating condition, said last named means comprising a normally closed switch, and means for maintaining said switch in open position until one of the units reaches proper operating condition.

CLARENCE W. NESSELL.